(No Model.)   2 Sheets—Sheet 1.
J. VANSTON.
SAWING MACHINE.
No. 274,419.   Patented Mar. 20, 1883.
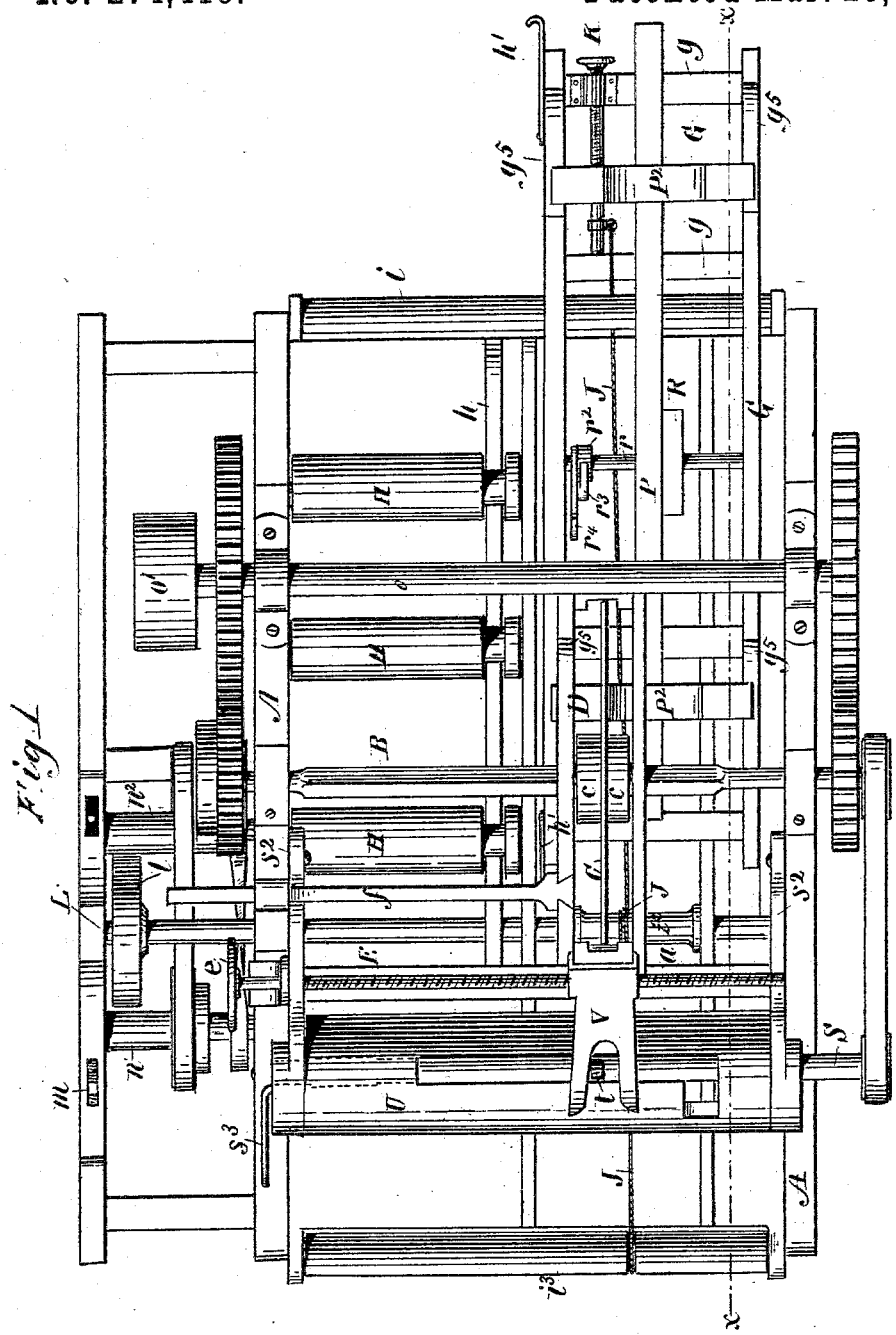
WITNESSES:
J. D. Garfield
C. Sedgwick
INVENTOR:
J. Vanston
BY
ATTORNEYS.

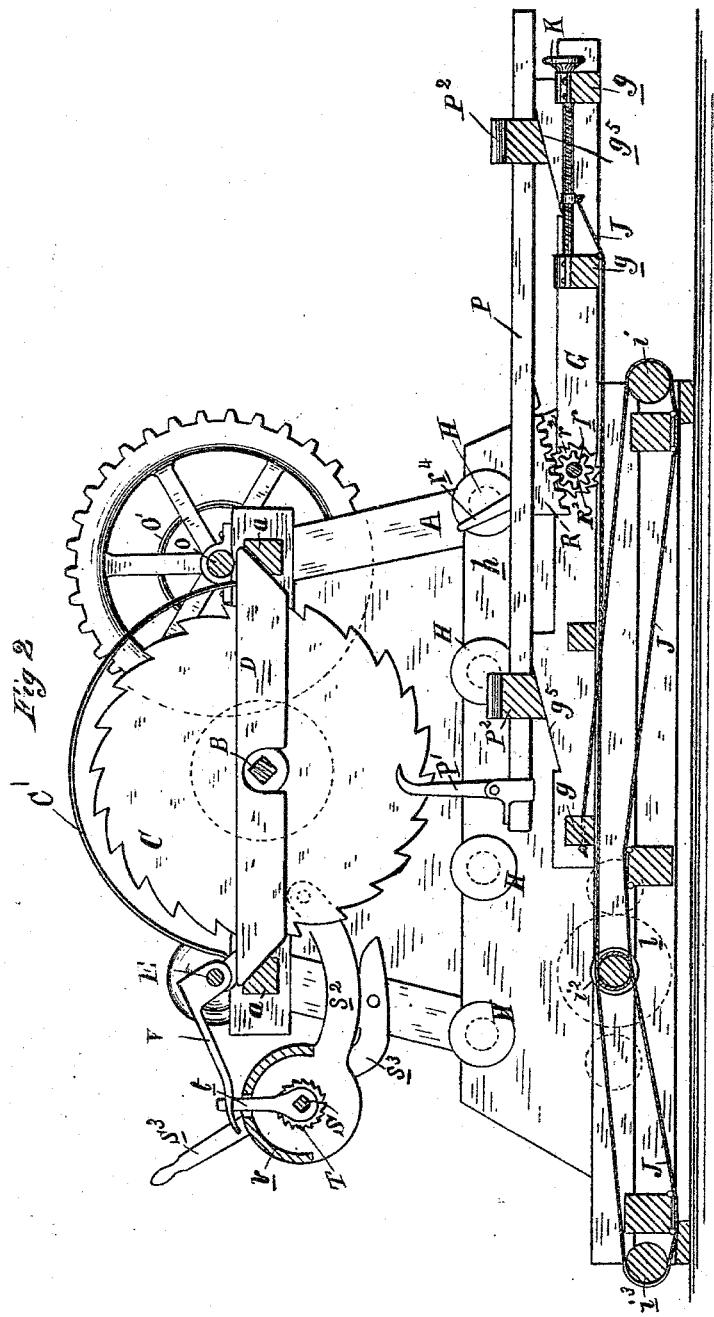

UNITED STATES PATENT OFFICE.

JOHN VANSTON, OF DURANGO, COLORADO.

SAWING-MACHINE.

SPECIFICATION forming part of Letters Patent No. 274,419, dated March 20, 1883.

Application filed September 29, 1882. (No model.)

*To all whom it may concern:*

Be it known that I, JOHN VANSTON, of Durango, in the county of La Plata and State of Colorado, have invented a new and useful Improvement in Sawing-Machines, of which the following is a full, clear, and exact description.

My invention relates to improvements in saw-mills; and it consists in the peculiar construction and arrangement of parts, as hereinafter fully described, and pointed out in the claims.

Reference is to be had to the accompanying drawings, forming part of this specification, in which similar letters of reference indicate corresponding parts in both the figures.

Figure 1 is a top view of a machine embodying my improvements, and Fig. 2 is a longitudinal vertical section of the same.

The working parts of the machine are carried by a frame, A, of any suitable construction. In the upper part of the frame is journaled a shaft, B, which carries a circular saw, C. The shaft B, except at its journals, is angular, and the eye of the saw and its clamps $c$ are of corresponding form, so that the saw may be moved laterally on the shaft, but will turn with said shaft. Fitting on either side of the saw-clamps is a frame, D, the ends of which rest on the bars $a$, which connect the side pieces of the frame A. One end of the frame D is provided with a nut, through which passes a screw-shaft, E, having bearings in the frame of the machine, and having one end provided with a hand-wheel, $e$. When the screw-shaft is turned in one direction or the other the frame D is shifted toward one side or the other of the frame of the machine, carrying the saw with it. By this construction and arrangement the log may be sawed up into boards without the necessity for changing its position on the carriage at every cut of the saw. The frame D is provided with a guiding-bar, $f$, extending horizontally from one side and working in a bearing in the frame of the machine.

As shown in the drawings, the shaft B sustains but a single saw C in its frame D; but two or more saws may be mounted on shaft B to revolve therewith, and in the arrangement of carriages herein shown, beneath the saw-shaft a larger saw on shaft B may be used over carriage G for sliding or siding up logs dogged to said carriage, and a smaller saw of thinner gage may be used for sawing the sided log carried over roller-carriage H into boards of any desired thickness; or the log may be both sided up and sawed into lumber by the same saw, C, working over carriage G, if desired, which arrangement is best suited for the smaller, lighter, and more portable mills, wherein the roller-carriage may also be dispensed with.

It will be noticed that in the use of one or two saws and log-carriages, arranged as above described, the log needs to be turned but once after siding up with a slabbed side down, when the saw or saws may readily be moved laterally upon the shaft or shafts carrying them, and it is thus only necessary to redog the sided log but once for sawing the log into any sized lumber or timber desired instead of three times, as is required when the saws have no lateral adjustment and the log is adjusted to the saw instead of adjusting the saw to the log, as in my machine. A particular advantage of hanging the saw above the log is that it permits the use of saws of smaller diameter in cutting the same size logs, the saw being adapted to enter the log clear down to its central collar, whereas in mills with the saw-shaft hung below the carriage the effective working-cut of the saw is reduced by the thickness of the carriage-frame. Another advantage of my construction results from the hanging of the saw or saws between two bearings, instead of outside of the bearings, thus preventing chattering or trembling of the saws when at work, insuring truer lumber and avoiding quick overheating of the saws; and, further, the use of smaller and consequently thinner saws avoids the wide saw-kerf so wasteful of timber.

It will of course be understood that a laterally-adjusting screw, E, may be employed at each end of the saw-frames D, instead of one screw E and a guide-bar, $f$, as shown, and any other approved means may be adopted to laterally adjust the saws. For instance, cam-fastenings or spring pawls and ratchets, either at one or both ends of the saw-frames D, and either with or without guide tongues or bars $f$, may be used to lock the saws in the desired position in proper alignment with the carriages below. By my arrangement, also, the shaft carrying two or more saws over the carriage may be reduced or rounded at certain points—near its end bearings, for instance—to permit a saw to be moved with its eye over the reduced shaft portion, in which position it may be locked at rest in its frame D to avoid waste of power expended in uselessly revolving it, although it is no detriment to the idle saw or to the mill to run it, and a suitable hood or cover, C', which may be adjusted both above and below the frame D, will prevent injury to the mill hand by the running of the saws.

In the lower part of the machine is a log-carriage, G, and a roller carriage-frame, h, lying side by side, and each occupying about half the width of the frame. The frame h has journaled therein, on suitable gudgeons, the carriage-rollers H, over which a log sided up on carriage G may be run to a second saw carried by shaft B, or to a saw carried by another shaft, said second saw or shaft not being shown in the drawings. Dogs h', attached to carriage G, are for use in holding a log on rollers H, to be moved over the rollers H to a saw as carriage G advances; or separate feed-works may be provided for carrying the log over rollers H, to be sided or cut into boards. By this arrangement carriage G and rollers H may be used at the same time to make two cuts through logs carried upon carriages G H by saws hung over them, as above described. The carriage G is operated by means of a rope or chain, J, having one end attached to one of the cross-bars $g$ of the carriage; then passed around a roller, $i$, at one end of the machine; then twice or more around a roller, $i^2$, between the ends of the machine; then around another roller, $i^3$, at the other end of the machine, and then attached to a hand-screw, K, working in two of the cross-bars $g$. The roller $i^2$ is provided at one end with a friction-pulley, $l$, and said end is journaled in a frame, L, arranged to slide in a direction parallel with the length of the frame of the machine, and provided with a hand-lever, $m$, for shifting it back or forward. On both sides of the friction-pulley $l$ are friction-pulleys $n$ $n^2$, one of which is driven by a straight belt and the other by a cross-belt from the saw-shaft of the machine. When the friction-pulley $l$ is shifted toward the pulley $n$ the carriage G moves in one direction, and when said pulley is shifted toward the pulley $n^2$ the carriage moves in the opposite direction. By means of the hand-screw K the rope or chain J may be tightened when desired. Any other system of feed-works may be employed to operate carriage G for sawing a single log or two logs by the use of roller-carriage h H; but the rope or chain attachment is to be preferred, as it permits considerable overhang of the logs at the end of the carriage, enabling a given length of carriage to work a longer log to the saw.

On the carriage G rests a frame consisting of a longitudinal bar, P, and two transverse bars, $P^2$. The transverse bars $P^2$ are beveled laterally, and rest upon inclined planes $g^5$ on the frame of the log-carriage. To the under side of the longitudinal bar P is attached a rack, R, which is inclined parallel with the inclined planes $g^5$, and which engages with a pinion, $R^2$, carried by a shaft, $r$, provided with a ratchet-wheel, $r^2$, actuated by a pawl, $r^3$, and lever $r^4$. By means of the lever and pawl the shaft $r$ may be turned so as to cause the engagement of the pinion with the rack to cause the frame P $P^2$ to slide up on the inclined planes $g^5$, so as to bring the log nearer to the saw. It will be noticed that frame P $P^2$ carries but a single dog, P', which has in practice been found sufficient to hold the log properly to the saw, owing to the tendency of the saw when cutting to force the log down and bed it firmly on the carriage.

At one end of the machine is a shaft, S, journaled in a frame, $S^2$, pivoted to the side pieces of the frame of the machine, and provided with a cam-lever, $s^3$, for raising and lowering it. On this shaft S is a small saw or cutter, T, arranged to slide on the shaft in the same manner as the saw C, as above described. The clamps which embrace the cutter terminate in an arm, $t$, which extends upward through a slot in a casing, $v$, which covers said shaft and cutter-head. The upper end of this arm $t$ is engaged by a forked arm, V, which is attached to the nut through which the screw-shaft E passes, so that when the saw is shifted, as above described, the cutter is shifted simultaneously, and parallel therewith. The cutter T serves to cut through the bark of the log and clear the way in advance of the saw, removing any stones or grit embedded in the bark, and giving notice, also, of rafting-spikes or other hard substances in the log in time to prevent damage to the main saw; and the labor of "barking" with an ax by hand is also done away with. A cutter, T, may be used in advance of each saw mounted in the mill. The shaft S is driven by a belt from the saw-shaft.

The operation of my invention is as follows: The log is first placed on the carriage G and held by dog P' and a slab sawed from one side. The saw C is then shifted so as to take a slab from the opposite side. The log is then turned on one of its flat sides and secured on the carriage by the dog P'. It is then sawed into boards by shifting the saw, as above described, instead of shifting the log on the carriage. If it is desired to groove or notch the log before sawing, the shaft S is lowered, so as to bring the small saw or cutter T in contact with the wood. When this cutter is not used it is raised and held out of the way by means of the cam-lever $s^3$. When two saws are used, one over each carriage G H, the first log sided up on the carriage G is easily rolled over on rollers H and secured for moving over the rollers by the dogs h', another log being now placed on carriage G to be sided up. On feeding carriage G forward both saws will make a cut, one in each log. A saving in labor and time is thus effected. When both saws are moved laterally with their frames D by a single screw E they must, when sawing up a log, cut timber or lumber of the same thickness; but two screw-shafts E, or equivalent devices, may be provided—one in front of the saw-frames D, as in the drawings, and another adjusting device at the back of the saw-frames for laterally moving the other saw—in which case the saws may be moved independently to cause each to cut any desired size of lumber or timber, as will be readily understood.

Power may be applied to the machine by suitable drive-pulleys and belts arranged to connect the saw-shaft; or shaft O, carrying pulley O', may be geared to the saw-shaft by cog-wheels, as shown in the drawings.

It will thus appear that my improved sawing machine or mill is well calculated to produce a given amount of lumber with less help than other mills by reason of reduced labor in handling and dogging the logs. Saws of thin gage may also be used, and the barking apparatus also aids increased production by its protection of the main saw, and the combined carriage and system of rollers enables two or more saws to be advantageously used at the same time.

Having thus fully described my invention, what I claim as new, and desire to secure by Letters Patent, is—

1. The combination, with the frame A, of the shaft B, the saw C, the clamps $c$, the sliding frame D, provided with a nut at one end, and the screw-shaft E, having bearings in the frame A, and working in the nut of the frame D, substantially as and for the purpose set forth.

2. The combination, with the saw C and means for moving the same laterally on its shaft, of the cutter T, arranged in advance of the saw, and adapted to be moved laterally on its shaft by the lateral movement of the saw, substantially as herein shown and described.

3. The combination, with the sliding frame D, the saw C, secured loosely on its shaft in the frame D, and the screw-shaft E, of the shaft S, the cutter T, secured loosely on the said shaft S, the slotted casing $v$, the arm $t$, extending up through the slot of the casing, and the forked arm V, attached to the frame D and engaging the arm $t$, substantially as herein shown and described.

4. The combination, with the frame A, of the carriage G, the hand-screw K, the rollers $i$ $i^2$ $i^3$, and the rope or chain J, passed around the said rollers, and having one end attached directly to carriage and the other end to the screw on the carriage, so as to tighten the rope or chain when necessary, substantially as herein shown and described.

5. The combination, with the carriage G, of the log-supporting frame P $P^2$, mounted upon the carriage, and means for raising and lowering the said frame on the carriage to bring the log nearer to or farther from the saw, substantially as herein shown and described.

6. The combination, with the log-carrier G, having the inclined planes $g^5$, of the frame consisting of the bars P $P^2$, the inclined rack R, and the pinion $R^2$, pawl $r^3$, and lever $r^4$, as shown and described, for the purpose specified.

7. The combination, with the carriage G, provided with dogs $h'$ at one side, of an auxiliary frame, $h$, arranged at one side of the carriage, and provided with rollers H, substantially as herein shown and described, whereby provision is made for moving forward a log on rollers H to a saw by the forward movement of the carriage G, as set forth.

8. The combination, with the carriage G, provided with the dogs $h'$ at one side, of the rollers H, arranged at one side of the said carriage, substantially as herein shown and described, and for the purpose set forth.

JOHN VANSTON.

Witnesses:
ALEX. KNIGHT,
M. D. RAACH.